US010873369B2

(12) United States Patent
Zhang et al.

(10) Patent No.: US 10,873,369 B2
(45) Date of Patent: Dec. 22, 2020

(54) COORDINATED MULTI-POINT (COMP) TRANSMISSION FROM A COMP CLUSTER

(71) Applicant: Telefonaktiebolaget LM Ericsson (publ), Stockholm (SE)

(72) Inventors: Zhang Zhang, Beijing (CN); Svante Bergman, Hägersten (SE); Jan Christoffersson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 321 days.

(21) Appl. No.: 15/776,215

(22) PCT Filed: Dec. 8, 2015

(86) PCT No.: PCT/CN2015/096660
§ 371 (c)(1),
(2) Date: May 15, 2018

(87) PCT Pub. No.: WO2017/096524
PCT Pub. Date: Jun. 15, 2017

(65) Prior Publication Data
US 2020/0259528 A1     Aug. 13, 2020

(51) Int. Cl.
*H04B 7/024*    (2017.01)
*H04L 5/00*     (2006.01)

(52) U.S. Cl.
CPC .......... *H04B 7/024* (2013.01); *H04L 5/0007* (2013.01); *H04L 5/0035* (2013.01); *H04L 5/0057* (2013.01)

(58) Field of Classification Search
CPC ..... H04B 7/024; H04L 5/0035; H04L 5/0007; H04L 5/0057
See application file for complete search history.

(56) References Cited

U.S. PATENT DOCUMENTS

| 2013/0258965 A1 | 10/2013 | Geirhofer et al. |
| 2014/0211695 A1 | 7/2014 | Cui et al. |

(Continued)

FOREIGN PATENT DOCUMENTS

| CN | 102013952 A | 4/2011 |
| CN | 104105211 A | 10/2014 |
| WO | 2014094246 A1 | 6/2014 |

OTHER PUBLICATIONS

3GPP, "3GPP TR 36.819 V11.2.0", 3rd Generation Partnership Project; Technical Specification Group Radio Access Network; Coordinated multi-point operation for LTE physical layer aspects (Release 11), Sep. 2013, pp. 1-70.

(Continued)

*Primary Examiner* — Nader Bolourchi
(74) *Attorney, Agent, or Firm* — Patent Portfolio Builders, PLLC

(57) ABSTRACT

A coordinated multipoint (CoMP) controller coordinates transmission from a CoMP cluster to a wireless communication device. The CoMP controller determines, from among multiple different coordination hypotheses for how to coordinate transmissions from the CoMP cluster to the wireless communication device, a coordination hypothesis to apply. The CoMP controller applies the determined coordination hypothesis to transmissions from the CoMP cluster on channel state information (CSI) radio resources on which the wireless communication device is to perform CSI measurements. Notably, though, the CoMP controller defers applying the determined coordination hypothesis to transmissions from the CoMP cluster on user data radio resources, until after the determined coordination hypothesis is applied to the transmissions on the CSI radio resources.

20 Claims, 8 Drawing Sheets

(56) References Cited

U.S. PATENT DOCUMENTS

2015/0117392 A1 4/2015 Hammarwall et al.
2015/0333845 A1* 11/2015 Zhang ................ H04B 7/0413
370/252

OTHER PUBLICATIONS

3GPP, "3GPP TR 36.871 V11.0.0", 3rd Generation Partnership Project; Technical Specification Group Radio Access Network; Evolved Universal Terrestrial Radio Access (E-UTRA); Downlink Multiple Input Multiple Output (MIMO) enhancement for LTE-Advanced (Release 11), Dec. 2011, pp. 1-17.

3GPP, "3GPP TS 36.213 V12.5.0", 3rd Generation Partnership Project; Technical Specification Group Radio Access Network; Evolved Universal Terrestrial Radio Access (E-UTRA); Physical layer procedures (Release 12), Mar. 2015, pp. 1-239.

Ericsson, "Signaling for Inter-eNB Operation of CoMP", 3GPP TSG RAN WG1 Meeting #76bis, R1-141790, Shenzhen, China, Mar. 13-Apr. 4, 2014, pp. 1-7.

* cited by examiner

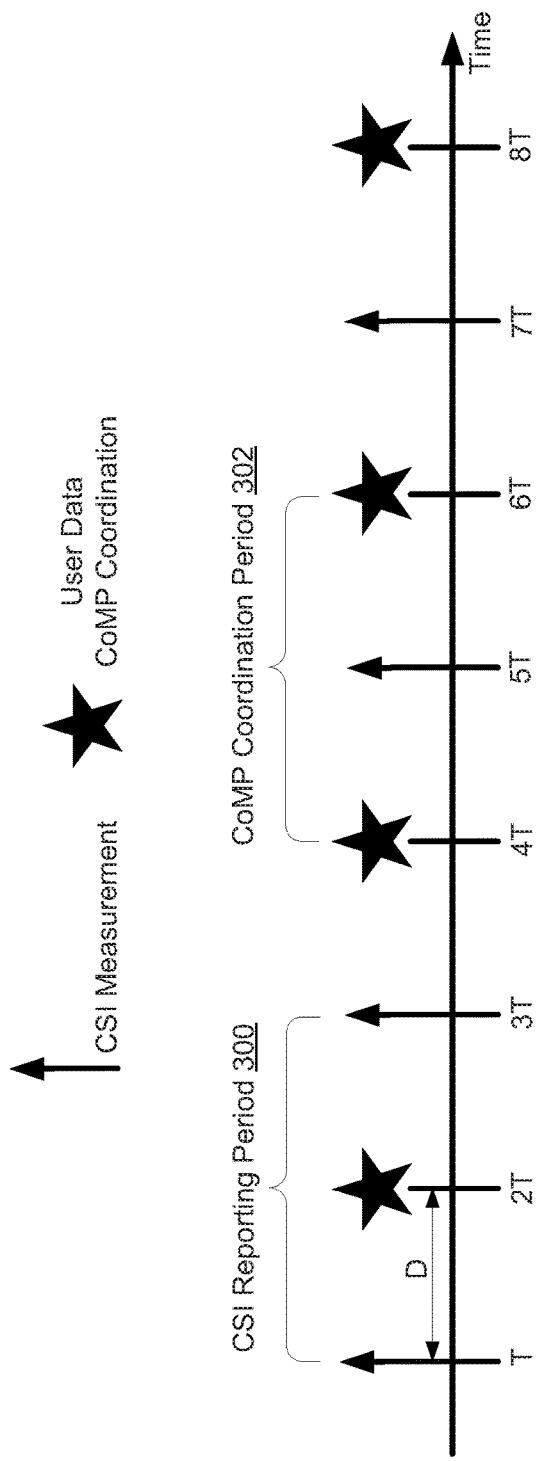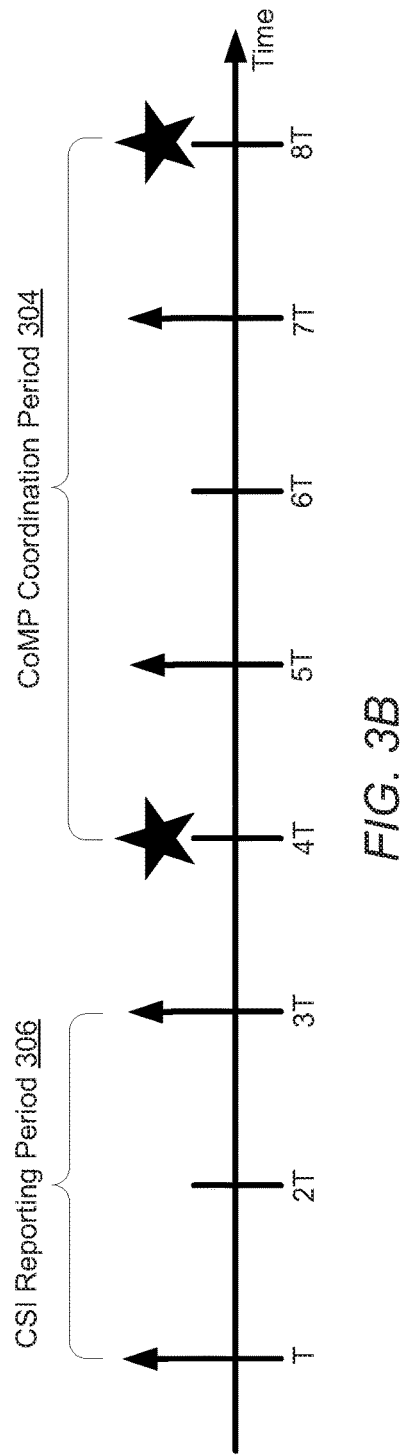

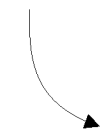

700

```
┌─────────────────────────────────────────────────────────────────────────┐
│ RECEIVE, FROM A COMP CONTROLLER, INSTRUCTIONS FOR SCHEDULING A USER     │
│  DATA TRANSMISSION TO THE WIRELESS COMMUNICATION DEVICE ON USER         │
│  DATA RADIO RESOURCES IN ACCORDANCE WITH A DETERMINATION BY THE         │
│  COMP CONTROLLER FOR HOW TO COORDINATE TRANSMISSIONS FROM THE           │
│       COMP CLUSTER TO THE WIRELESS COMMUNICATION DEVICE                 │
│                                  702                                    │
└─────────────────────────────────────────────────────────────────────────┘
```

```
┌─────────────────────────────────────────────────────────────────────────┐
│   DETERMINE, BASED ON THE INSTRUCTIONS, A TRANSMISSION TO PERFORM ON    │
│    CSI RADIO RESOURCES WHEN PERFORMING THE SCHEDULED USER DATA          │
│                              TRANSMISSION                               │
│                                  704                                    │
└─────────────────────────────────────────────────────────────────────────┘
```

```
┌─────────────────────────────────────────────────────────────────────────┐
│  PERFORM THE DETERMINED TRANSMISSION ON THE CSI RADIO RESOURCES BEFORE  │
│  PERFORMING THE SCHEDULED USER DATA TRANSMISSION ON THE USER DATA RADIO │
│                               RESOURCES                                 │
│                                  706                                    │
└─────────────────────────────────────────────────────────────────────────┘
```

*FIG. 7*

COORDINATED MULTI-POINT (COMP) TRANSMISSION FROM A COMP CLUSTER

CROSS-REFERENCE TO RELATED APPLICATION

This application is a U.S. National Stage Filing under 35 U.S.C. § 371 of International Application No. PCT/CN2015/096660, filed on Dec. 8, 2015, the disclosure of which is fully incorporated herein by reference.

TECHNICAL FIELD

The present application is related to Coordinated Multipoint (CoMP) transmission, and more specifically, to CoMP transmission from a CoMP cluster to a wireless communication device.

BACKGROUND

The general framework of coordinated multipoint (CoMP) refers to a system where the transmissions from multiple geographically separated transmission points (e.g., base stations or network antennas) are coordinated. The set of points whose transmissions are coordinated may be referred to as a CoMP cluster. Different CoMP techniques include Coordinated Scheduling or Dynamic Point Blanking (DPB), Dynamic point selection (DPS), Joint Transmission and Coordinated Beamforming.

In general, DPS finds the most suitable transmission point(s) (TPs) in a CoMP cluster to serve a wireless communication device. The selection of serving TP(s) may be based on various criteria, such as maximizing total CoMP cluster throughput. DPS may be performed dynamically (e.g., within a 10 ms frame or even a multiple of 10 ms frames in Long Term Evolution (LTE) systems).

With DPB, the serving TP for each device remains unchanged but some TP(s) may be muted (i.e., blanked) for a short time period. This muting decreases the interference to transmissions from un-muted TP(s) and may consequently improve the transmission throughput of the devices served by un-muted TP(s). However, the potential cost of improving transmission throughput for devices served by un-muted TPs may be decreased average throughput for devices served by muted TPs.

A CoMP controller coordinates transmissions from the CoMP cluster to a wireless communication device. The CoMP controller in this regard identifies different possibilities for how to coordinate those transmissions. These different possibilities are referred to as different coordination hypotheses. The CoMP controller periodically selects which coordination hypothesis to apply for transmissions to a wireless communication device. This period with which the CoMP controller coordinates transmissions is referred to as the CoMP coordination period (or simply coordination period).

In some implementations, the CoMP controller selects which coordination hypothesis to apply for transmissions to a wireless communication device using channel state information (CSI) fed back from that device. CSI may either directly characterize the channel state (e.g., with complex valued elements of a measured effective channel) or indirectly characterize the channel state (e.g., as a transmission configuration recommended in view of the measured effective channel). In LTE, for example, CSI indirectly characterizes the channel state in terms of a recommended precoding matrix indicator (PMI), rank indicator (RI), and channel quality indicator (CQI). In any event, though, the wireless communication device generates this CSI feedback by performing CSI measurements on so-called CSI radio resources.

CSI feedback from a wireless communication device may also be used for adapting one or more parameters governing the transmission of user data on the serving TP's link to the device. Transmission parameters involved in this link adaptation (LA) may include for instance the modulation and coding scheme applied to the user data transmission.

CoMP transmission complicates link adaptation. Conventionally, the CoMP controller synchronously applies a selected coordination hypothesis to both the CSI radio resources and the radio resources on which user data is transmitted (i.e., the user data radio resources). When the CoMP controller selects and synchronously applies a different coordination hypothesis at coordination period boundaries, the interference situation in the CoMP cluster changes, perhaps quite drastically. This interference variation coupled with CSI feedback delay means that CSI feedback is often stale because it no longer accurately reflects the channel state by the time it is used for link adaptation (e.g., the CSI feedback was formed in a previous coordination period than that in which link adaptation is performed). This in turn results in suboptimal system performance.

SUMMARY

According to one or more embodiments herein, a CoMP controller defers applying a CoMP coordination hypothesis to transmissions from a CoMP cluster on user data radio resources, until after that hypothesis is applied to transmissions from the CoMP cluster on CSI radio resources. That is, the CoMP controller asynchronously applies the hypothesis to the CSI radio resources earlier than it applies the hypothesis to the user data resources. This proves advantageous, for example, because CSI feedback reflecting the channel state that will exist when the CoMP controller later applies the CoMP coordination hypothesis to the user data radio resources may be formed and reported in advance of that application. Such early CSI feedback reporting eliminates or at least reduces the time spent performing link adaptation using stale or outdated CSI feedback. This remains especially true if the CSI feedback is reported early enough such that it is received and processed before the CoMP controller applies the CoMP coordination hypothesis to the user data radio resources.

More particularly, embodiments herein include a method implemented by a coordinated multipoint (CoMP) controller for coordinating transmission from a CoMP cluster to a wireless communication device. The method includes determining, from among multiple different coordination hypotheses for how to coordinate transmissions from the CoMP cluster to the wireless communication device, a coordination hypothesis to apply. The method also includes applying the determined coordination hypothesis to transmissions from the CoMP cluster on channel state information (CSI) radio resources on which the wireless communication device is to perform CSI measurements. The method further entails deferring applying the determined coordination hypothesis to transmissions from the CoMP cluster on user data radio resources, until after the determined coordination hypothesis is applied to the transmissions on the CSI radio resources.

In one or more embodiments, such deferring comprises deferring applying the determined coordination hypothesis to transmissions from the CoMP cluster on the user data radio resources, until CSI feedback indicating said measurements has been or is expected to have been received and processed by a radio resource manager for one or more transmission points in the CoMP cluster. Alternatively or additionally, this deferring comprises deferring applying the determined coordination hypothesis to transmissions from the CoMP cluster on the user data radio resources, until after a predetermined time interval has passed since applying the determined coordination hypothesis to the transmissions on the CSI radio resources.

In some embodiments, determining the coordination hypothesis comprises determining the coordination hypothesis using reference signal received power (RSRP) based quality estimation.

In one or more embodiments, the CoMP controller maintains application of the determined coordination hypothesis to the transmissions on the user data radio resources over a CoMP coordination period. In one embodiment, the CoMP coordination period has a length that is an integer multiple of a periodic interval at which the wireless communication device reports CSI feedback indicating CSI measurements. Alternatively or additionally, the CoMP coordination period is based on estimated CSI feedback delay.

In some embodiments, for example, the CoMP coordination period is calculated as max(n*CSI_reporting_period, ceil(CSI_feedback_delay/CSI_reporting_period)*CSI_reporting_period), where n is an integer number, CSI_reporting_period is the length in time of a CSI reporting period of the wireless communication device, and CSI_feedback_delay is an estimated CSI feedback delay.

Alternatively or additionally, the CoMP coordination period is based on an estimated length of a filter with which the CSI measurements are filtered.

The CoMP coordination period in some embodiments is specific to the wireless communication device and is different than a CoMP coordination period maintained for a different wireless communication device.

In one such embodiment, the CoMP coordination period specific to the wireless communication device comprises a first portion occurring during a first CoMP coordination period maintained for the different wireless communication device and comprises a second portion occurring during a second CoMP coordination period maintained for the different wireless communication device. In this case, the CoMP controller may be configured to apply the determined coordination hypothesis to transmissions from the CoMP cluster on CSI radio resources on which the wireless communication device is to perform CSI measurements that reflect CSI during said first portion. The CoMP controller further determines, from among the multiple different coordination hypotheses, a different coordination hypothesis. Finally, the CoMP controller applies the different coordination hypothesis to transmissions from the CoMP cluster on CSI radio resources on which the wireless communication device is to perform CSI measurements that reflect CSI during said second portion.

In still other embodiments, the CoMP coordination period has a length corresponding to the longest of different CSI reporting periods configured for wireless communication devices in a defined set.

Alternatively or additionally, the CoMP controller defers applying the determined coordination hypothesis to transmissions from the CoMP cluster on the user data radio resources, until after a time interval has passed since applying the determined coordination hypothesis to the transmissions on the CSI radio resources. This time interval is based on a longest CSI feedback delay experienced by wireless communication devices in a defined set.

Embodiments herein also include a method implemented by a transmission point in a coordinated multipoint (CoMP) cluster for CoMP transmission to a wireless communication device. The method comprises receiving, from a CoMP controller, instructions for scheduling a user data transmission to the wireless communication device on user data radio resources in accordance with a determination by the CoMP controller for how to coordinate transmissions from the CoMP cluster to the wireless communication device. The method also comprises determining, based on the instructions, a transmission to perform on channel state information (CSI) radio resources when performing the scheduled user data transmission. The method further entails performing the determined transmission on the CSI radio resources before performing the scheduled user data transmission on the user data radio resources.

In some embodiments, performing the determined transmission on the CSI radio resources by advancing the transmission on CSI radio resources, relative to the scheduled user data transmission, by a period of time greater than or equal to an expected delay in receiving and processing CSI feedback from the wireless communication device indicating CSI measurements performed on those CSI radio resources.

Alternatively or additionally, performing the determined transmission on the CSI radio resources comprises advancing the transmission on CSI radio resources, relative to the scheduled user data transmission, by a predetermined time interval.

In one or more embodiments, the transmission point also receives CSI feedback indicating CSI measurements performed by the wireless communication device on the CSI radio resources. In this case, the transmission point performs the scheduled user data transmission on the user data radio resources after receiving and processing the CSI feedback.

In any of the above embodiments, the CSI radio resources may comprise one or more CSI reference signal (CSI-RS) resources and one or more CSI interference measurement (CSI-IM) resources. Alternatively or additionally, the user data radio resources comprise radio resources of a physical downlink shared channel (PDSCH), in a Long Term Evolution (LTE) system.

Embodiments herein also comprise corresponding apparatus, computer programs, and carriers.

For example, embodiments include a coordinated multipoint (CoMP) controller for coordinating transmission from a CoMP cluster to a wireless communication device. The CoMP controller is configured to determine, from among multiple different coordination hypotheses for how to coordinate transmissions from the CoMP cluster to the wireless communication device, a coordination hypothesis to apply. The CoMP controller is further configured to apply the determined coordination hypothesis to transmissions from the CoMP cluster on channel state information (CSI) radio resources on which the wireless communication device is to perform CSI measurements. The CoMP controller is also configured to defer applying the determined coordination hypothesis to transmissions from the CoMP cluster on user data radio resources, until after the determined coordination hypothesis is applied to the transmissions on the CSI radio resources.

Embodiments also include a transmission point in a coordinated multipoint (CoMP) cluster for CoMP transmissions to a wireless communication device. The transmission point is configured to receive, from a CoMP controller, instructions for scheduling a user data transmission to the wireless communication device on user data radio resources in accordance with a determination by the CoMP controller for how to coordinate transmissions from the CoMP cluster to the wireless communication device. The transmission point is further configured to determine, based on the instructions, a transmission to perform on channel state information (CSI) radio resources when performing the scheduled user data transmission. The transmission point is also configured to perform the determined transmission on the CSI radio resources before performing the scheduled user data transmission on the user data radio resources.

Of course, the present application is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

FIGS. 3A-3B are timing diagrams illustrating the relationship between a CoMP coordination period and a CSI reporting period according to one or more embodiments.

FIG. 7 is a logic flow diagram of a method performed by a transmission point according to one or more embodiments.

DETAILED DESCRIPTION

Figure 1:
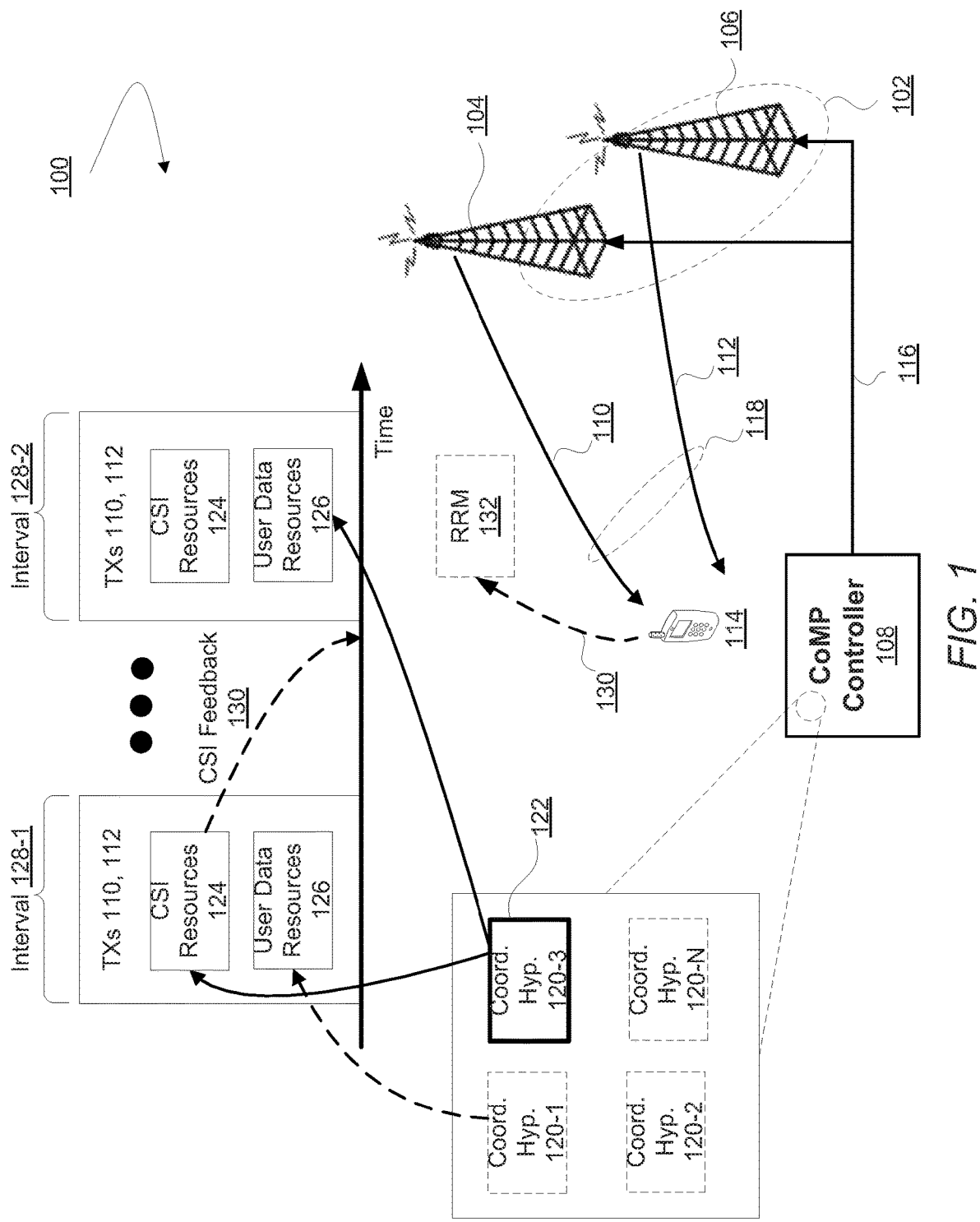
FIG. 1 is a block diagram of a CoMP system including a CoMP controller and transmission points configured according to one or more embodiments herein.

FIG. 1 illustrates a coordinated multipoint (CoMP) system 100 according to one or more embodiments. The CoMP system 100 includes one or more CoMP clusters, each comprising two or more geographically separated transmission points (TPs). The exemplary CoMP cluster 102 shown in FIG. 1 includes TPs 104 and 106.

A CoMP controller 108 coordinates transmissions 110, 112 from the CoMP cluster 102 to a wireless communication device 114, e.g., according to a Dynamic Point Selection (DPS) or Dynamic Point Blanking (DPB) technique. The CoMP controller 108 performs this coordination via control signaling 116. The transmissions 110, 112 so coordinated may be referred to as a CoMP transmission 118.

The transmissions 110, 112 are performed on radio resources. Different types of radio resources include user data radio resources and channel state information (CSI) radio resources. User data radio resources are allocated, reserved, or otherwise designated as radio resources on which user data (e.g., desired payload) is transmitted. CSI radio resources are radio resources on which CSI measurements are to be performed (e.g., reference signal measurements and/or interference measurements).

Figure 2:
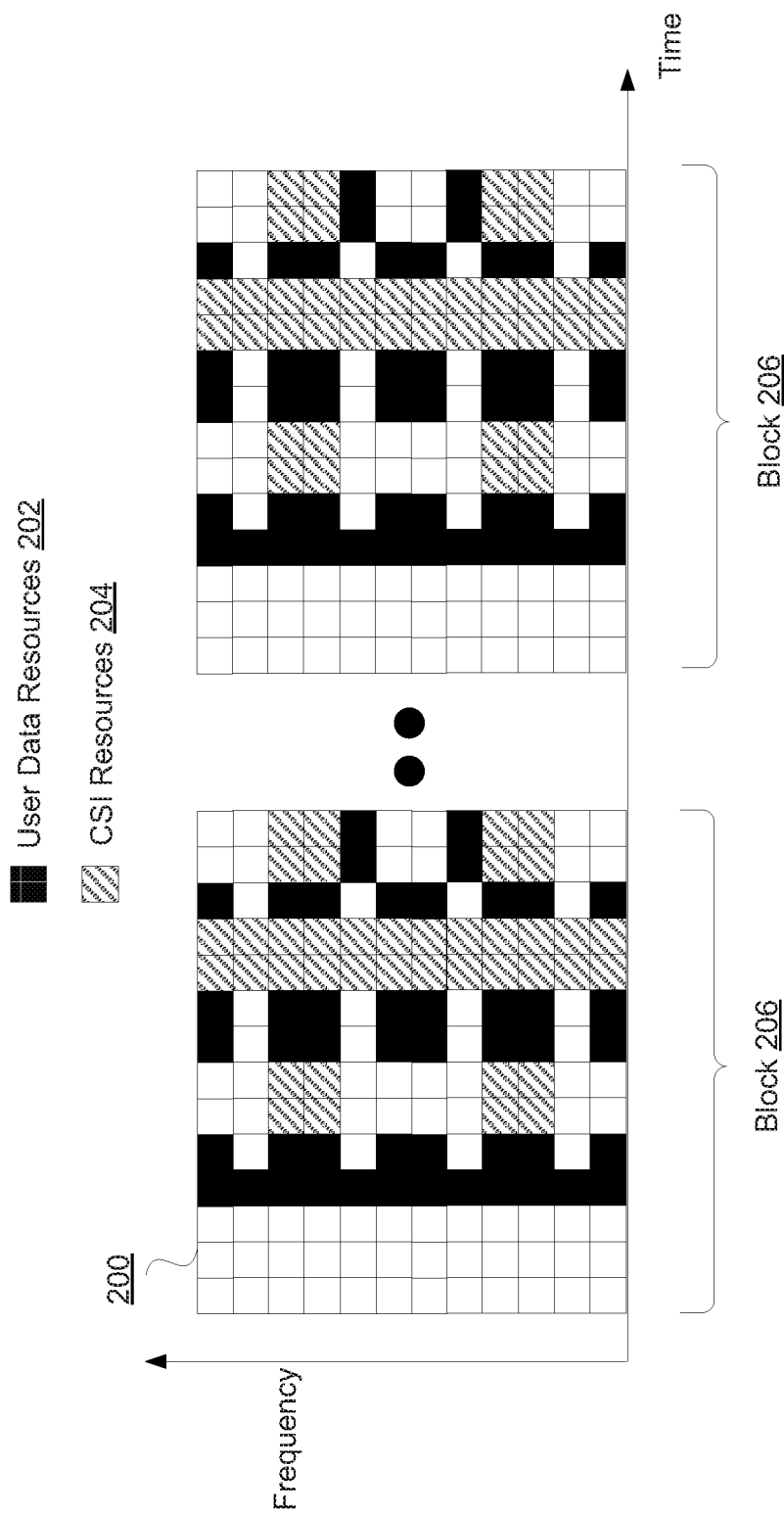
FIG. 2 is a block diagram of user data radio resources and CSI radio resources embodied as time-frequency resources according to one example.

As a brief example, FIG. 2 illustrates some embodiments where user data radio resources and CSI radio resources comprise different sets of time-frequency resources 200. As shown, user data resources 202 are mapped to certain locations in a time-frequency grid according to a defined pattern, and CSI resources 204 are mapped to other locations in the time-frequency grid according to a different pattern. The resources 202, 204 may map to the grid in this way during each of multiple time periods, shown in FIG. 2 as blocks 206. For example, in some embodiments wherein the CoMP transmission comprises an LTE transmission, the time-frequency resources 200 comprise resource elements (REs), each of which consists of a single subcarrier during a single OFDM symbol. In such a case, each block 206 comprises a resource block (RB), consisting of a group of subcarriers (e.g., 12) across multiple OFDM symbols (e.g., 6 or 7).

No matter the particular structure or arrangement of the radio resources, FIG. 1 shows that the TPs 104, 106 perform multiple transmissions 110, 112 to the device 114 over multiple time intervals 128 (e.g., intervals 128-1 and 128-2). During each time interval in which the transmissions 110, 112 are performed, they are performed on both CSI resources 124 and user data resources 126.

To control how the transmissions 110, 112 are performed during any given time interval 128, the CoMP controller 108 identifies or otherwise obtains different possibilities for how to coordinate the transmissions 110, 112 from the CoMP cluster (i.e., from the CoMP cluster's TPs 104, 106). These different possibilities are referred to as different coordination hypotheses. FIG. 1 for instance illustrates N different hypotheses 120-1, 120-2, 120-3, . . . 120-N, collectively referred to as hypotheses 120.

As shown, the CoMP controller 108 determines, from among the different coordination hypotheses 120, a coordination hypothesis 122 to apply. The CoMP controller 108 applies the determined coordination hypothesis 122 to transmissions 110, 112 from the CoMP cluster 102 on CSI radio resources 124 on which the device 114 is to perform CSI measurements. Notably, though, the CoMP controller 108 defers applying the determined coordination hypothesis 122 to transmissions 110, 112 from the CoMP cluster 102 on user data radio resources 126, until after the determined coordination hypothesis 122 is applied (at least initially) to the transmissions 110, 112 on the CSI radio resources 124.

FIG. 1 as an example illustrates that the CoMP controller 108 applies the determined coordination hypothesis 122 to transmissions 110, 112 that occur on CSI radio resources 112 during time interval 128-1. But the CoMP controller 108 refrains from applying that hypothesis 122 to transmissions 110, 112 which occur on user data radio resources 126 during that time interval 128-1. Instead, the CoMP controller 108 may apply a different coordination hypothesis (e.g., hypothesis 120-1) to transmissions 110, 112 that occur on user data radio resources 126 during time interval 128-1. After the hypothesis 122 is applied to the transmissions 110, 112 on the CSI radio resources 124 during time interval 128-1, though, the CoMP controller 108 indeed applies that hypothesis 122 to transmissions 110, 112 that occur on user data radio resources 126 during a later time interval 128-2. That is, the CoMP controller 108 asynchronously applies the hypothesis 122 to the CSI radio resources 124 earlier than it applies the hypothesis 122 to the user data resources 126. In at least some embodiments, therefore, this approach is succinctly referred to as deferment of user data resource CoMP coordination or, equivalently, advancement of CSI resource CoMP coordination.

In at least some embodiments, the device 114 performs CSI measurements on the CSI radio resources 124 to which the hypothesis 122 has been applied, i.e., during time interval 128-1. Notably, these CSI measurements effectively reflect the channel state that will exist on the user data radio resources 126 when the CoMP controller 108 later applies that same hypothesis 122 to the user data radio resources 126, i.e., during time interval 128-2. That is, the device 114 measures on the CSI radio resources 124 "as if" the coordination hypothesis 122 has been applied to the transmissions 110, 112 on the user data radio resources 126. Accordingly, applying the hypothesis 122 to the CSI resources 124 before applying that hypothesis 122 to the user data resources 126 gives the device 114 a "head start" in performing the CSI measurements and feeding back CSI that will be applicable for those user data resources 126.

In at least some embodiments, the "head start" is at least as large as the so-called CSI feedback delay. In these and other embodiments, CSI feedback delay experienced by a wireless communication device 114 may comprise at least a delay between (i) the device 114 measuring on CSI radio resources and/or transmitting corresponding CSI feedback, and (ii) a radio resource manager (RRM) 132 for one or more (serving) TPs 104, 106 in the CoMP cluster receiving and/or processing that CSI feedback (e.g., for performing link adaptation). That is, the CSI feedback delay may include the time for the device 114 to perform measurements on the CSI radio resources and then to process and/or report the measurements to the RRM 132. In other embodiments, the CSI feedback delay comprises at least a delay between (i) generating a transmission on the CSI radio resources 124 for measurement by the device 114; and (ii) the RRM 132 receiving and/or processing CSI feedback reported based on measurement of those CSI radio resources 124 (e.g., for use to alter data transmissions). For example, in one or more embodiments, the CSI feedback delay encompasses delay that concludes when the RRM 132 has received, decoded and processed a CSI report, and has performed link adaptation based on the CSI. Alternatively or additionally, CSI feedback delay may constitute the delay between a CSI radio resource transmission and the first user data transmission that is adaptable based on CSI feedback reported for that CSI radio resource transmission.

Regardless, if the "head start" given to the device 114 is at least as large as the CSI feedback delay, the CSI feedback 130 as shown in FIG. 1 will be received and/or processed by the RRM 132 for one or more (serving) TPs 104, 106 even before the CoMP controller 108 applies the hypothesis 122 to the user data resources 126, i.e., before time interval 128-2. This means that the CSI feedback 130 would be immediately available at the radio resource manager 132, e.g., for link adaptation, when the hypothesis 122 is initially applied to the user data resources 126.

In general, therefore, the CoMP controller 108 in some embodiments defers applying the determined coordination hypothesis 122 to transmissions 110, 112 from the CoMP cluster 120 on the user data radio resources 126, until this CSI feedback 130 indicating the CSI measurements has been received and/or processed by the RRM 132 for one or more TPs 104, 106 in the CoMP cluster 102. The CoMP controller 108 may for instance wait to apply the hypothesis 122 to transmissions 110, 112 on the user data radio resources 126 until the CoMP controller 108 determines that the RRM 132 has received and/or processed all or some of the CSI feedback 130. In embodiments where the RRM 132 is implemented separately from the CoMP controller 108, therefore, the CoMP controller 108 may wait to apply the hypothesis 122 until the CoMP controller 108 receives a confirmation from the RRM 132 that the CSI feedback 130 has been received and/or processed.

Alternatively, the CoMP controller 108 in other embodiments dynamically computes or adaptively determines the deferment time. The CoMP controller 108 may for instance compute statistics on the delay between applying the hypothesis 122 to the CSI resources 124 and the RRM 132 receiving and/or processing the corresponding CSI feedback 130. The CoMP controller 108 may then identify the most appropriate deferment time from those statistics, as updated from time to time. The device 114 and/or the RRM 132 in this regard can report the CSI feedback delay to the CoMP controller, or the RRM 132 and/or the CoMP controller 108 may estimate the delay themselves.

In yet other embodiments, by contrast, the CoMP controller 108 defers applying the hypothesis 122 to transmissions 110, 112 on the user data resources 126 until the CSI feedback 130 is expected to have been received and/or processed by the RRM 132 for one or more TPs 104, 106 in the CoMP cluster 102. For example, the CoMP controller 108 in one embodiment is configured to wait until a predetermined time interval (e.g., 1 ms, 2 ms, 5 ms, or 6 ms) has passed since applying the hypothesis 122 to the transmissions 110, 112 on the CSI resources 124 before applying that hypothesis 122 to transmissions 110, 112 on the user data resources 126. In one embodiment, this predetermined time interval constitutes an average or a worst-case CSI feedback delay. Basing deferral on a predetermined time period reduces complexity and/or required signaling, but risks the CSI feedback 130 being received and/or processed after the hypothesis 122 has been applied to the user data resources 126 (e.g., if a worst-case scenario occurs but the predetermined time period does not account for that scenario). In any event, though, advancing application of the hypothesis 122 to the CSI resources 124 still reduces the time between applying the hypothesis 122 to the user data resources 126 and receiving and/or processing the applicable CSI feedback 130. The impact of CSI feedback delay is thereby mitigated as the quality variation due to CoMP coordination is effectively taken care of in advance when the device 114 performs CSI measurements.

In some embodiments, the RRM 132 uses the CSI feedback 130 to perform link adaptation; that is, to adapt one or more parameters governing the transmission of user data to the device 114 on the user data resources 126. Transmission parameters involved in this link adaptation (LA) may include for instance the modulation and coding scheme applied to the user data transmission. Advancing application of the hypothesis 122 to the CSI resources 124 eliminates or at least reduces the time spent performing link adaptation using stale CSI feedback.

In one or more embodiments, the CoMP controller 108 uses the CSI feedback 130 at least in part to determine which coordination hypothesis 120 to apply next. Alternatively or additionally, the CoMP controller 108 uses reference signal received power (RSRP) based quality estimation to determine which coordination hypothesis 120 to apply. That is, in some embodiments, the CoMP controller 108 determines to apply coordination hypothesis 122, e.g., to CSI resources 124 during interval 128-1, at least partly using RSRP reported by the device 114. This RSRP report may for instance be a wideband report reflecting RSRP across the CoMP cluster's operating bandwidth.

An RSRP report from the device 114 effectively indicates the performance of each of the different coordination hypotheses 120 under consideration by the CoMP controller.

RSRP based estimation therefore advantageously dispenses with the requirement that the device 114 feed back multiple individual CSI reports respectively characterizing different hypotheses' performance. That is, RSRP based estimation minimizes or at least reduces CSI feedback overhead. One exemplary approach to using RSRP to estimate performance in terms of a signal-to-interference-plus-noise ratio (SINR) involves computing SINR as:

$$SINR_i = \begin{cases} \dfrac{c * RSRP_i}{\sum_{j \ne i} a_{j,tx} * RSRP_j + n}, & \text{Rank} = 1 \\ \dfrac{RSRP_i}{RSRP_i * \beta + \sum_{j \ne i} a_{j,tx} * RSRP_j + n}, & \text{Rank} = 2 \end{cases}$$

where c is an antenna combination gain (typically equal to the number of receive antennas), β is an inter-stream interference factor, n is the noise power, i is the serving TP and j are the interfering TPs. $a_{j,tx}$ is set by the system depending on if the corresponding TP 104, 106 is assumed to transmit (set to 1) or be muted (set to 0).

Various embodiments above advantageously improve CSI estimation, e.g., resulting in improved link adaptation. The embodiments do so by deferring application of a coordination hypothesis 122 to the user data resources 126, e.g., so as to mitigate the effects of CSI feedback delay. Other embodiments herein improve CSI estimation by alternatively or additionally configuring in a certain way a period over which the CoMP controller 108 maintains application of a coordination hypothesis 122 to the user data resources 126.

In some embodiments, for example, the CoMP controller 108 maintains application of the determined coordination hypothesis 122 to the transmissions 110, 112 on the user data radio resources 126 over a so-called CoMP coordination period. This CoMP coordination period is referred to as being a "period" in the sense that it is a periodic interval of time (e.g., every 10 ms). That is, the CoMP controller 108 periodically determines which of the coordination hypothesis 120 to apply to transmissions on the user data radio resources 126, and continues applying that hypothesis for a defined period of time, at which point the CoMP controller 108 applies a potentially different hypothesis, e.g., if the channel state justifies switching hypotheses.

In one or more embodiments, the CoMP coordination period has a length that is an integer multiple (1, 2, 3, etc.) of a periodic interval at which the device 114 reports CSI feedback 130. For example, if this CSI reporting period is 10 ms, then the CoMP coordination period may be configured as 10 ms, 20 ms, etc. in length. TP(s) 104, 106 may know this CSI reporting period as it is configured by the system. The periodic interval may be configured in at least one of several ways. In a first example referred to as "periodic CSI", the system defines the periodic interval by configuring the wireless communication device 114 to report CSI every X ms. In a second example referred to as "a-periodic CSI", the TP(s) 104, 106 periodically trigger a CSI report from the wireless communication device 114. That is, every X ms the network would communicate to or trigger the wireless communication device 114 to report CSI. FIGS. 3A and 3B illustrate two examples.

As shown in FIG. 3A, the wireless communication device 114 reports CSI feedback based on measurement of the CSI radio resources 124 at certain times (i.e., T, 3T, 5T, 7T), with a period of 2T referred to as CSI reporting period 300. The CoMP controller 108 applies a coordination hypothesis to transmissions on the user data radio resources 126 at other times (i.e., 2T, 4T, 6T, 8T), also with a period of 2T. That is, the CoMP coordination period 302 has a length of 2T. The CoMP coordination period 302 is configured in this way to have the same length as the CSI reporting period 300.

FIG. 3A of course shows that the CoMP coordination period 302 is offset in time from the CSI reporting period 300, e.g., by a time of T. This time offset T in FIG. 3A reflects the CoMP controller's deferred application of the coordination hypothesis to the user data radio resources 26, so as to account for CSI feedback delay D as described above. Accordingly, in some embodiments, the device 114 measures on the CSI radio resources at time T, and the RRM 132 receives and processes associated CSI feedback 130 at or before time 2T. Meanwhile, the CoMP controller 108 applies the same hypothesis that was previously applied to transmissions on the CSI resources 124 (for CSI measurement at time T) to the user data radio resources 126 at time 2T. The CoMP controller 108 maintains application of that hypothesis to transmissions on the user data resources 126 until time 4T, at which points a different hypothesis may be applied.

As a concrete example in the context of embodiments based on LTE, time T may occur at the beginning of a 10 ms frame, such that frame boundaries occur at times T, 3T, 5T, and 7T. With each 10 ms frame consisting of ten 1 ms subframes, CSI measurement and/or reporting may occur at the first subframe of each 10 ms frame, resulting in a 10 ms CSI reporting period. If the CSI report is received and/or processed by time 2T (i.e., by the start of the sixth subframe), CSI feedback delay D would be approximately 5 ms. With the CoMP coordination period set to the same length as the CSI reporting period, namely 10 ms, this means the CoMP coordination period extends from the start of the sixth subframe of one frame (e.g., at time 2T) to the end of the fifth subframe in the next successive frame (e.g., at time 4T).

FIG. 3B illustrates an embodiment where the CoMP coordination period has a different length than the CSI reporting period. The CoMP coordination period in this case has a length that is a multiple of the CSI reporting period's length. As shown, for example, the CoMP coordination period 304 is twice as long as the CSI reporting period 306.

In general, then, the CoMP coordination period has a length n*CSI_Reporting_Period, where CSI_Reporting_Period is the CSI reporting period's length and n is an integer greater than or equal to 1. By having the CoMP coordination period's length be an integer multiple of the CSI reporting period's length, CSI estimation proves more robust in the face of (potentially drastic) channel state changes at CoMP coordination period boundaries. This is especially true when the CoMP coordination period is adapted or otherwise configured in this way, in conjunction with deferred user data CoMP coordination as described above. Indeed, as shown in FIG. 3A, the CSI report at time T characterizes the channel state that will exist when the CoMP controller 108 performs user data CoMP coordination at time 2T. Since the CoMP controller 108 continues to apply the same user data CoMP coordination hypothesis until time 4T, that CSI report remains "valid" or "fresh" (at least as it relates to CoMP coordination boundaries) until time 4T. Embodiments that configure the coordination period in this way thereby mitigate CSI estimation error that would otherwise result from a mismatch between the CoMP coordination period and the CSI reporting period.

In some embodiments, the CoMP coordination period is alternatively or additionally based on the CSI feedback delay. In one embodiment, the CoMP controller 108 adapts the coordination period to be longer as the CSI feedback delay lengthens (e.g., relative to the CSI reporting period). As a specific example, the CoMP controller 108 may set the CoMP coordination period to have a length (ceil (CSI_feedback_delay/CSI_Reporting_Period)*CSI_Reporting_Period, where CSI_feedback_delay is the CSI feedback delay and CSI_Reporting_Period is the CSI reporting period's length. Setting the coordination period in this way may advantageously avoid performance oscillation due to too frequent CoMP coordination when CSI feedback delay is (relatively) large.

In still other embodiments, the CoMP controller 108 combines the above approaches in controlling the CoMP coordination period's length. For example, the CoMP controller 108 in one embodiment computes the coordination period as max(n*CSI_reporting_period, ceil(CSI_feedback_delay/CSI_reporting_period)*CSI_reporting_period). Ceil(x) is a function for determining the smallest integer not less than x. In other words, in these example embodiments, the coordination period is a multiple of the CSI reporting period, but not less than the CSI feedback delay.

Of course, in yet other embodiments, the CoMP coordination period is not dependent on the CSI feedback delay. In this case, the CoMP controller 108 may apply multiple different coordination hypotheses to transmissions on the CSI radio resources before the CSI feedback arrives at the TP(s) 104, 106.

The CoMP coordination period alternatively or additionally is configured based on the (estimated) extent, if any, of CSI measurement filtering performed by the device 114 in forming the CSI feedback. Indeed, such filtering threatens to at least partly transfer dynamic interference reflected in one CSI measurement (e.g., occurring near a coordination period boundary) to one or more subsequent CSI measurements. Lengthening the coordination period for greater extents of filtering mitigates this interference transfer. Accordingly, in such embodiments, the CoMP coordination period is based on an actual or estimated length of a filter with which the CSI measurements are filtered. Alternatively or additionally, the time by which CSI resource CoMP coordination is advanced increases for greater extents of CSI measurement filtering.

Although embodiments herein have focused for simplicity on coordinating transmissions 110, 112 to a single wireless communication device 114, coordination may occur in a similar fashion for transmissions to one or more other wireless communication devices served by the CoMP cluster 102. In this context, the amount of time by which user data resource CoMP coordination is deferred and/or the user data CoMP coordination period for the device 114 may be specific to that device 114 or may be common amongst all or some of the other devices.

For example, in some embodiments, the amount of time by which user data resource CoMP coordination is deferred is set according to the longest CSI feedback delay experienced by wireless communication devices in a defined set (e.g., those devices served by the CoMP cluster 102). The deferral amount for other devices in the set may similarly be configured, such that user data resource CoMP coordination is deferred by the same amount for all devices in the set.

In another example, the device's CoMP coordination period has a length corresponding to the longest of different CSI reporting periods configured for wireless communication devices in a defined set (e.g., those being served by the CoMP cluster 102). The CoMP coordination period for the other devices in the set may be similarly configured, such that all devices in the set share a common CoMP coordination period length.

In still other embodiments, though, the user data CoMP coordination period for the device 114 is specific to that device 114. With the coordination period being device-specific, that period may be different than a CoMP coordination period maintained for a different wireless communication device. Device-specific coordination periods advantageously tailor a coordination period to each particular device's CSI reporting period, CSI feedback delay, channel state, and/or other constraints and demands applicable to that device. Such allows for more dynamical CoMP coordination for devices experiencing short CSI feedback delay and/or quick CSI reporting periodicity, while accommodating devices experiencing long CSI feedback delay and/or CSI reporting periodicity with less dynamic CoMP coordination.

Figure 4:
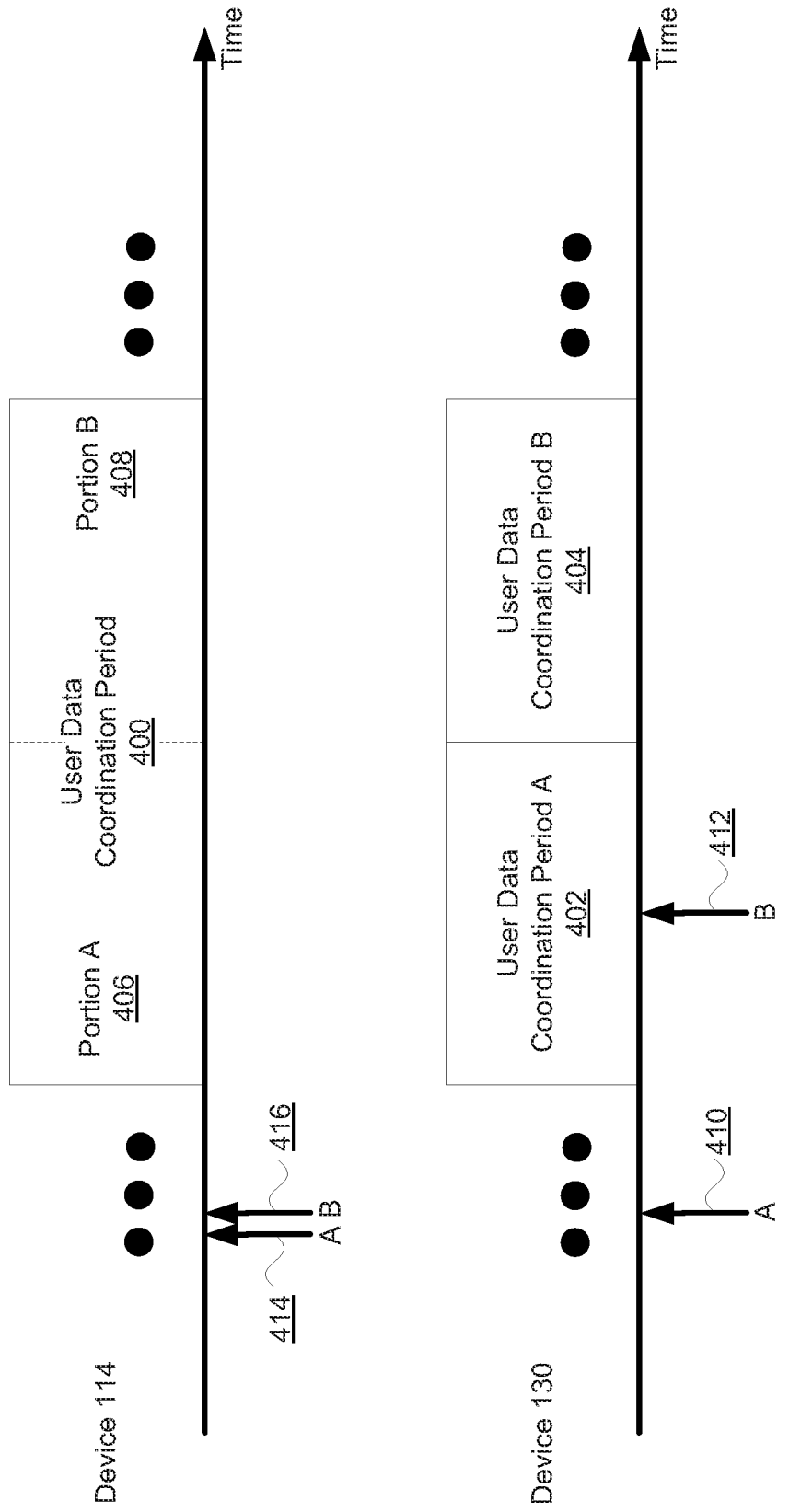
FIG. 4 is a timing diagram illustrating the relationship between different CoMP coordination periods for different devices according to one or more embodiments.

FIG. 4 illustrates one example where a user data CoMP coordination period 400 maintained for device 114 is longer than a user data CoMP coordination period maintained for a different device 130. In fact, as shown, the user data coordination period 400 for device 114 spans two smaller coordination periods 402 and 404 for device 130, e.g., because device 114's CSI reporting period is twice as long as device 130's CSI reporting period (e.g. 10 ms vs. 5 ms). The two smaller coordination periods 402 and 404 are also referred to as user data coordination period A and user data coordination period B. The user data coordination period 400 for device 114 has one portion, namely Portion A 406, that occurs during device 130's user data coordination period A. The user data coordination period 400 also has another portion, namely Portion B 408, that occurs during device 130's user data coordination period B.

The CoMP controller 108 defers user data CoMP coordination until after CSI resource CoMP coordination as described above for both devices 114, 130. Device 130 performs time advanced CSI measurements that will reflect the CSI during user data coordination period A, and reports those CSI measurements in a report 410 prior to user data coordination period A. With a relatively short CSI reporting period, device 130 likewise performs time advanced CSI measurements that will reflect the CSI during user data coordination period B, and reports those CSI measurements in a report 412 prior to user data coordination period B.

Notably, the boundary between device 130's coordination periods A and B occurs during the middle of device 114's longer coordination period 400 (i.e., between portions A and B). Accordingly, even though the CoMP controller 108 continues to apply the same coordination hypothesis to device 114's transmissions throughout device 114's coordination period 400, this mid-coordination-period change in how transmissions are coordinated for device 130 threatens to drastically change the interference suffered by transmissions to device 114 during Portion B.

According to one or more embodiments, therefore, device 114 performs both (i) time advanced CSI measurements that will reflect the CSI during Portion A of its coordination period 400; and (ii) time advanced CSI measurements that will reflect the CSI during Portion B of its coordination period 400. That is, the device 114 performs different CSI measurements under different coordination hypotheses (i.e., different CSI processes as explained below), one applicable for Portion A and another applicable for Portion B. The device 114 sends different CSI reports 414, 416 for the different CSI measurements, both in advance of the user data coordination period 400.

Armed with both CSI reports 414, 416, the RRM 132 in some embodiments uses CSI report 414 (e.g., for link adaptation) during Portion A of the coordination period 400, but switches to using CSI report 416 (e.g., for link adaptation) during Portion B of the coordination period 400. Meanwhile, the CoMP controller 108 continues to apply the same coordination hypothesis throughout the coordination period 400.

In at least some embodiments, this means the CoMP controller 108 determines which coordination hypothesis it will eventually apply during device 130's coordination period B earlier than otherwise necessary. For example, the CoMP controller 108 may determine which coordination hypothesis to apply during user data coordination period B before it even receives CSI reports 410, 414, and 416 from the devices 114, 130. The CoMP controller 108 may do so in order to apply that same hypothesis to CSI resources on which device 114 is to perform the CSI measurements that form the basis for CSI report 416. In this way, the CoMP controller 108 anticipates and accounts for the mid-coordination-period interference variation at the boundary between portions A and B of coordination period 400.

Although this "multi-report" technique mitigates CSI estimation error caused by mid-coordination-period interference variation, the technique requires more CSI reporting overhead. In at least some embodiments, therefore, the CoMP controller 108 dynamically determines which of the above multi-device techniques to employ for each device (or for each group of devices). For example, in one embodiment, the CoMP controller 108 identifies devices with CSI reporting periods greater than a defined threshold. The CoMP controller 108 employs the multi-report technique for these devices. The CoMP controller 108 then configures the remaining devices to share a common coordination period length corresponding to the longest of the devices' CSI reporting periods. The CoMP controller 108 thereby minimizes CSI reporting overhead by limiting the devices that transmit multiple CSI reports, while at the same time minimizes the devices' coordination period lengths by excluding from consideration those devices with lengthy CSI reporting periods.

In some embodiments, each coordination hypothesis herein comprises the combination of a signal hypothesis and an interference hypothesis. The signal hypothesis specifies the TP(s) from which user data is assumed to be transmitted to the device 114. The interference hypothesis reflects interference suffered during the assumed user data transmission (e.g., depending on which TPs, if any, are muted).

In one or more embodiments (e.g., based on LTE), the device 114 measures the signal and interference hypotheses on different types of CSI radio resources. Specifically, the device 114 measures the signal hypothesis on so-called CSI reference signal (CSI-RS) resources, and measures the interference hypothesis on so-called CSI interference measurement (CSI-IM) resources. A CSI-RS resource is a resource on which a certain TP transmits CSI-RS, though perhaps with zero power. A CSI-IM resource is a resource that is muted intentionally by certain TPs, such that those TPs do not transmit any signal on that resource. That is, each different CSI-IM configuration represents an interference situation under a certain interference hypotheses, while the CSI-RS configuration represents the link that a device may use for transmission under a certain signal (i.e., serving point) hypotheses. The device 114 will assume that the total signal received on the CSI-IM resource strictly reflects interference on that resource. The CoMP controller 108 thereby coordinates which TPs mute on a zero-power CSI-RS that overlaps with a given CSI-IM resource and which TPs still transmit on a CSI-RS that overlaps with the given CSI-IM resource, so that the total received signal on the CSI-IM resource matches a certain interference hypothesis to be measured by the device 114.

In this context, the CoMP controller's selection of a particular coordination hypothesis to apply involves the selection of both a signal hypothesis and an interference hypothesis. This means that the CoMP controller selects which TP(s) will transmit and which will be muted on the CSI-IM resources. For Dynamic Point Selection (DPS), the CoMP controller 108 will also select which TP(s) will serve the device 114. Based on this selection, the CoMP controller 108 applies the selected coordination hypothesis to transmissions on CSI radio resources by configuring transmissions on CSI-IM resources according to the constituent interference hypothesis, e.g., via radio resource control (RRC) signaling. For each transmitting TP, associated devices will measure interference on a corresponding CSI-IM (per TP) and report associated CSI feedback. In one or more embodiments, user data CoMP coordination is performed after reception of this CSI feedback.

For Dynamic Point Blanking (DPB), only one coordination hypothesis needs to be measured per device. This means that only one so-called CSI process is needed per device, where a CSI process is a process for measuring the CSI of one particular coordination hypothesis. For DPD, though, a device may change its serving TP. Accordingly, multiple CSI processes may be configured for each device. For example the i'th CSI process may correspond to the i'th strongest TP that would serve the device (regardless of if the TP will be muted or not). The transmissions on CSI-IM resources are configured according to the interference situation obtained from the DPS coordination. Each TP will be configured with one CSI-IM, representing the interference given the obtained coordination excluding the contribution from that TP.

Some embodiments herein thereby reduce the number of CSI processes that a devices needs to measure on, as compared to conventional approaches. This reduction conserves scarce CSI resources. Indeed, in one or more embodiments, even the most capable devices can measure on at most three CSI-IM resources at any given time.

Those skilled in the art will appreciate that radio resources herein comprise any resources that support a radio transmission thereon. The radio resources may for instance comprise time-frequency resources defined at any granularity or resolution of time and frequency. For instance, any given radio resource may comprise a resource element (RE) comprising a single subcarrier during a single OFDM symbol, may comprise a resource block (RB) comprising a group of subcarriers (e.g., 12) spanning across multiple OFDM symbols (e.g., 7), may comprise a resource block pair comprising a pair of resource blocks, or the like.

A transmission point (TP) as used herein comprises any apparatus capable of transmitting a radio signal. A transmission point may be for instance a radio network node such as a base station (e.g., eNodeB in LTE), a part of a radio network node, or even just a remote radio head or remote radio unit coupled to a radio network node.

A wireless communication device herein refers to any device capable of communicating wirelessly with a transmission point. The device may be for instance a user equipment (UE); however it should be noted that a UE does not necessarily have a "user" in the sense of an individual person owning and/or operating the device. The device may therefore also be characterized as a machine-to-machine (M2M) device, a machine-type communications (MTC) device, and/or an internet of things (IoT) device, e.g., generally configured to transmit and/or receive data without direct human interaction. Other examples of a device includes sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used.

In view of this, those skilled in the art will also appreciate that user data as used herein comprises any data directly or indirectly addressed to a wireless communication device 114, or its user (if any), in association with an application executing on the device 114. The term "user" therefore may broadly refer to an application on the device 114 that uses the data, rather than a human user of the device 114. As an example, user data may comprise packet data, such as, multimedia data, voice data, text data, and/or other data related to IP-based services. User data excludes reference signals or synchronization signals.

In some contexts, user data is transmitted over one or more data channels, as distinguished from one or more control channels over which control data is transmitted. The control data supports transmission of the user data over the data channel(s). In some embodiments, a data channel may transport user data in the form of not only application data (e.g., voice or video) but also a different type of control data than that transported by a control channel. For example, one type of control data may be transmitted over a data channel on a time basis slower than a time basis on which a different type of control data is transmitted over a control channel. In this case, the control data transmitted over the data channel constitutes user data as well. In at least some embodiments, the type of control data transmitted over a data channel generally controls transmission at a higher protocol layer (e.g., a radio resource control layer) whereas the type of control data transmitted over a control channel generally controls transmission at a lower protocol layer (e.g., a physical layer). In at least some embodiments, the system includes a data channel over which different user data is conveyed for different users in a shared fashion, but includes multiple different control channels that exclusively convey different control data for different individual devices. That is, in such embodiments, any control data conveyed on any given control channel is exclusively addressed to one particular device. In some embodiments where the system is or evolves from Long Term Evolution (LTE), for example, the control channel is a Physical Downlink Control Channel (PDCCH) or an enhanced PDCCH (ePDCCH), the data channel is a Physical Downlink Shared Channel (PDSCH), the control data is Downlink Control Information (DCI), and the user data is PDSCH user data, e.g., from the Dedicated Traffic Channel (DTCH).

The CoMP controller 108 herein may be located at one of the TPs 104, 106 or may be located separately from the TPs 104, 106, e.g., at some other location in a radio access network, within a core network, or even an external network. The embodiments of the present disclosure describe the function(s) of the CoMP controller without limitation to the location of the CoMP controller 108.

In one or more embodiments, a radio resource manager (RRM) 132 discussed herein is a logical entity that is implemented by one or more physical nodes for performing one or more of the following: scheduling and link adaptation, receiving and processing CSI feedback 130, and interacting with the CoMP controller 108. The RRM 132 as a logical entity may be implemented by a single physical node in a centralized fashion, or at or across multiple physical nodes in a distributed fashion. CSI feedback delay as contemplated herein does not depend on whether the RRM 132 is implemented in a distributed or centralized fashion.

In some embodiments, the RRM 132 is centrally implemented in a single physical node, e.g., the same node that implements the CoMP controller 108 so as to co-locate the RRM 132 and CoMP controller 108. Centralizing RRM in this way may prove attractive for instance if backhaul latency is low, if the TPs 104, 106 merely comprise remote radio heads, and/or if coordination entails dynamic point selection (DPS).

In other embodiments, the RRM 132 is distributively implemented at multiple ones of the individual TPs 104, 106. Distributed implementation may complicate DPS, though. In this case, the reported CSI may be received by one (main) TP (or access point in the case of uplink), while the data transmission is temporarily done from another TP. Centralized RRM would simplify CSI processing, since the CSI is then 'automatically' available at the RRM. But decentralized RRM is still realized in some embodiments by allowing the CSI to be conveyed over the backhaul from the main TP to the temporarily serving TP (e.g., where link adaptation is performed).

Figure 5:
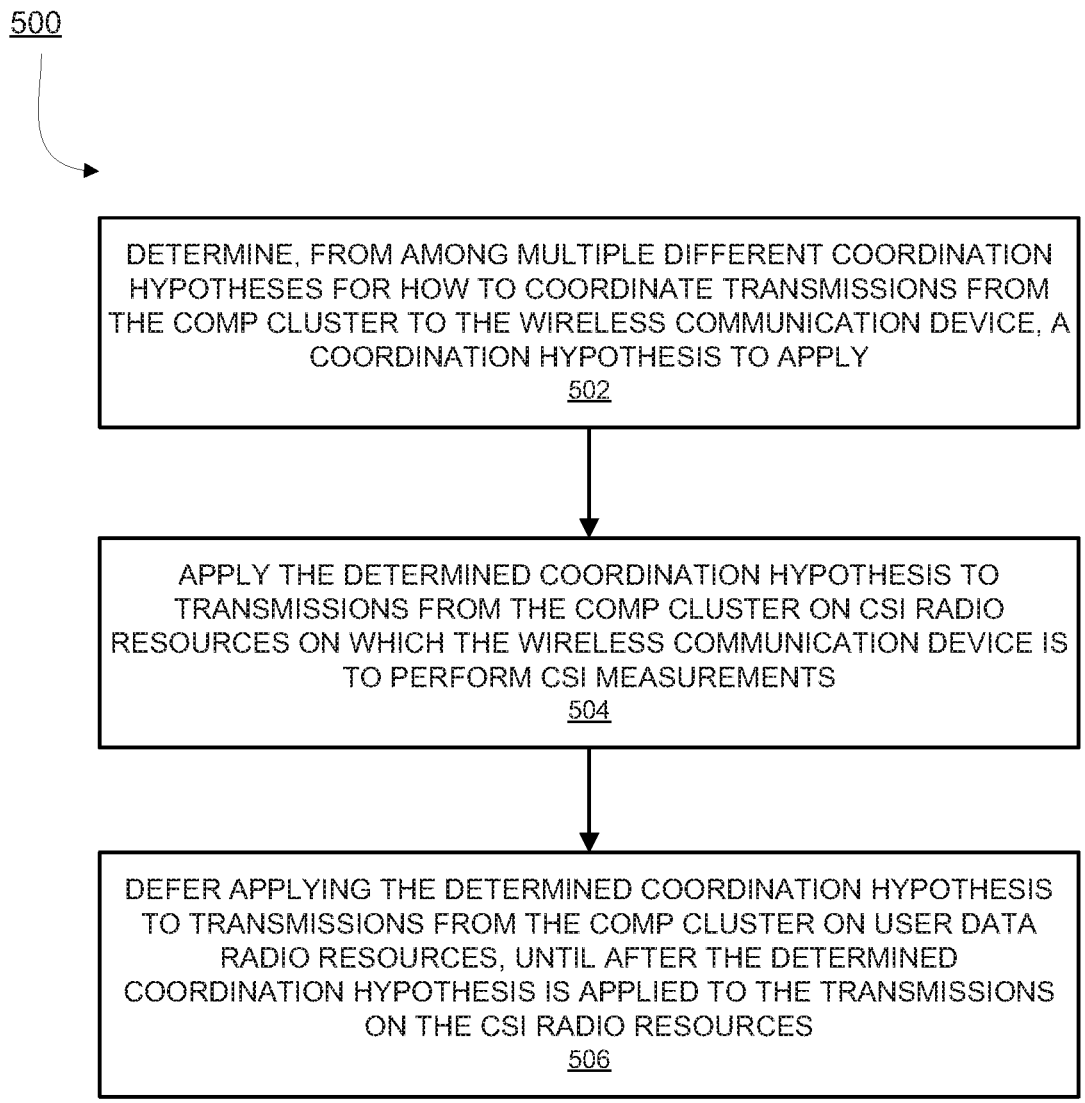
FIG. 5 is a logic flow diagram of a method performed by a CoMP controller according to one or more embodiments.

In view of the above modifications and variations, those skilled in the art will appreciate that the CoMP controller 108 herein generally performs the processing 500 shown in FIG. 5 for coordinating transmissions 110, 112 from a CoMP cluster 102 to a wireless communication device 114. As shown, processing 500 includes determining, from among multiple different coordination hypotheses 120 for how to coordinate transmissions 110, 112 from the CoMP cluster 102 to the wireless communication device 114, a coordination hypothesis 122 to apply (Block 502). Processing 500 further comprises applying the determined coordination hypothesis 122 to transmissions 110, 112 from the CoMP cluster 102 on CSI radio resources 124 on which the wireless communication device 114 is to perform CSI measurements (Block 504). Processing 500 also entails deferring applying the determined coordination hypothesis 122 to transmissions 110, 112 from the CoMP cluster 102 on user data radio resources 126, until after the determined coordination hypothesis 122 is applied to the transmissions 110, 112 on the CSI radio resources 124 (Block 506).

The CoMP controller 108 may be configured to perform as described above by implementing any functional means or units. These means or units may for instance be implemented with respective circuits configured to perform the respective steps illustrated in FIG. 6 and described throughout the disclosure.

Figure 6:
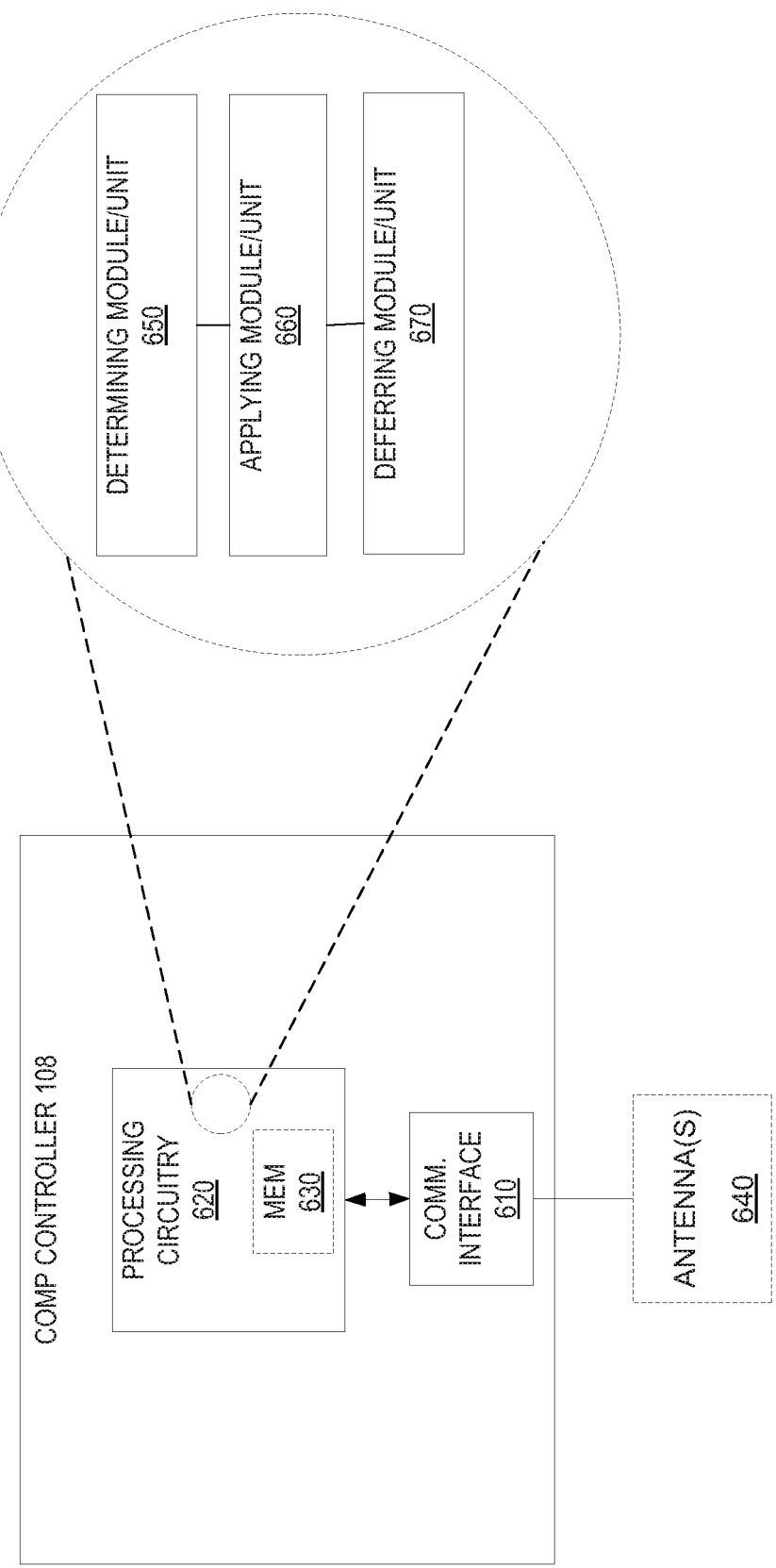
FIG. 6 is a block diagram of a CoMP controller according to one or more embodiments.

In one embodiment, for example, the CoMP controller 108 comprises a communication interface 610 and processing circuitry 620 as shown in FIG. 6. In this case, the communication interface 610 comprises a network interface and/o radio circuitry for communicating with TPs being controlled. The network interface and/or radio circuitry may be comprised as any number of transceiving, receiving, and/or transmitting units or circuitry. It should further be appreciated that the communication interface 610 may be in the form of any input or output communications port known in the art. Where the communication interface 610 includes radio circuitry, for example, the CoMP controller 108 may communicate via one or more associated antennas 640.

Via this communication interface 610, the processing circuitry 620 is configured, e.g., by executable instructions in memory 630, to determine a coordination hypothesis to apply, apply the determined coordination hypothesis to transmissions from the CoMP cluster 102 on CSI radio resources, and defer applying the determined coordination hypothesis to transmissions from the CoMP cluster 102 on user data radio resources, until after the determined coordination hypothesis is applied to the transmissions on the CSI radio resources as described above.

FIG. 6 also correspondingly illustrates certain functional means or units that the CoMP controller 108 implements in this regard. The CoMP controller 108 includes a determining module or unit 650 configured for said determining, an applying module or unit 660 configured for said applying, and a deferring module or unit 670 configured for said deferring as described above.

In another embodiment, the deferring module is configured to defer applying the determined coordination hypothesis to transmissions from the CoMP cluster on the user data radio resources, until CSI feedback indicating said measurements has been or is expected to have been received and processed by a radio resource manager for one or more transmission points in the CoMP cluster.

In another embodiment, the deferring module is configured to defer applying the determined coordination hypothesis to transmissions from the CoMP cluster on the user data radio resources, until after a predetermined time interval has passed since applying the determined coordination hypothesis to the transmissions on the CSI radio resources.

In another embodiment, the determining module is configured to determine the coordination hypothesis using reference signal received power (RSRP) based quality estimation.

In another embodiment, the applying module is configured to maintain application of the determined coordination hypothesis to the transmissions on the user data radio resources over a CoMP coordination period, wherein the CoMP coordination period is based on an integer multiple of a periodic interval at which the wireless communication device reports CSI feedback indicating CSI measurements.

In another embodiment, the applying module is configured to maintain application of the determined coordination hypothesis to the transmissions on the user data radio resources over a CoMP coordination period, wherein the CoMP coordination period is based on estimated CSI feedback delay.

In another embodiment, the applying module is configured to maintain application of the determined coordination hypothesis to the transmissions on the user data radio resources over a CoMP coordination period, wherein the CoMP coordination period is calculated as: max (n*CSI_reporting_period, ceil(CSI_feedback_delay/CSI_reporting_period)*CSI_reporting_period), where n is an integer number, CSI_reporting_period is the length in time of a CSI reporting period of the wireless communication device, and CSI_feedback_delay is an estimated CSI feedback delay.

In another embodiment, the applying module is configured to maintain application of the determined coordination hypothesis to the transmissions on the user data radio resources over a CoMP coordination period, wherein the CoMP coordination period is based on an estimated length of a filter with which the CSI measurements are filtered.

In another embodiment, the applying module is configured to maintain application of the determined coordination hypothesis to the transmissions on the user data radio resources over a CoMP coordination period, wherein the CoMP coordination period is specific to the wireless communication device and is different than a CoMP coordination period maintained for a different wireless communication device.

In another embodiment, the applying module is configured, wherein the CoMP coordination period spans at least a first and second CoMP coordination period maintained for the different wireless communication device, to determine, from among the multiple different coordination hypotheses a different coordination hypothesis; to apply the determined coordination hypothesis to transmissions from the CoMP cluster on channel state information (CSI) radio resources on which the wireless communication device is to perform CSI measurements that reflect CSI during a portion of the CoMP coordination period specific to the wireless communication device, wherein the portion corresponds to a first CoMP coordination period of the different wireless communication device; and to apply the different coordination hypothesis to transmissions from the CoMP cluster on CSI radio resources on which the wireless communication device is to perform CSI measurements that reflect CSI during a different portion of the CoMP coordination period specific to the wireless communication device, wherein the different portion corresponds to a second CoMP coordination period of the different wireless communication device.

In another embodiment, the applying module is configured, wherein the CoMP coordination period is based on the longest of different CSI reporting periods defined for different wireless communication devices.

In another embodiment, the deferring module is configured to defer applying the determined coordination hypothesis to transmissions from the CoMP cluster on the user data radio resources, until after a time interval has passed since applying the determined coordination hypothesis to the transmissions on the CSI radio resources, wherein said time interval is based on a longest CSI feedback delay experienced by wireless communication devices in a defined set.

Although embodiments above focus on the CoMP controller 108 being configured to defer user data CoMP coordination, other embodiments herein include a TP that is configured to effectively accomplish this deferral. That is, some of the intelligence described above at the CoMP controller 108 is distributed to the TP(s). From the TP perspective, though, deferral of user data CoMP coordination may appear as advancing transmission on the CSI radio resources. FIG. 7 illustrates processing 700 performed by a TP in this regard according to one or more embodiments.

As shown in FIG. 7, processing 700 at a TP comprises receiving, from the CoMP controller 108, instructions for scheduling a user data transmission to a wireless communication device 114 on user data radio resources 126 in accordance with a determination by the CoMP controller 108 for how to coordinate transmissions 110, 112 from the CoMP cluster 102 to the wireless communication device 114 (Block 702). Processing 700 further includes determining, based on the instructions, a transmission to perform on CSI radio resources 124 when performing the scheduled user data transmission (Block 704). That is, the TP itself autonomously identifies how to transmit on the CSI radio resources 124 in such a way that the device 114 will be able to measure the coordination hypothesis to be applied to the user data transmission. Notably, rather than naively performing this determined transmission at the same time as the user data transmission, processing 700 entails performing the determined transmission on the CSI radio resources 124 before performing the scheduled user data transmission on the user data radio resources 126 (Block 706).

In some embodiments, for example, the TP receives CSI feedback indicating CSI measurements performed by the wireless communication device 114 on the CSI radio resources 124. That is, the TP at least partly implements the RRM 132. In this case, the TP may perform the scheduled user data transmission on the user data radio resources (only) after receiving and processing the CSI feedback. That is, the TP performs the determined transmission on the CSI radio resources 124 far enough in advance of the scheduled user data transmission, so that the corresponding CSI feedback will be received and processed before the scheduled user data transmission begins. The TP may for instance measure, monitor, or otherwise estimate CSI feedback delay for the device 114, and advance the timing of the CSI radio resource transmission by at least that delay. Correspondingly, in one or more embodiments, the TP advances the transmission on CSI radio resources, relative to the scheduled user data transmission, by a period of time greater than or equal to an expected delay in receiving and processing CSI feedback from the wireless communication device 114 indicating CSI measurements performed on those CSI radio resources 124.

Of course, as alluded to above with respect to the CoMP controller 108, the TP may alternatively just advance the CSI radio resource transmission by a predetermined time interval. That is, the TP may advance the transmission on CSI radio resources 124, relative to the scheduled user data transmission, by a predetermined time interval (e.g., established based on a worst-case or average CSI feedback delay).

Figure 8:
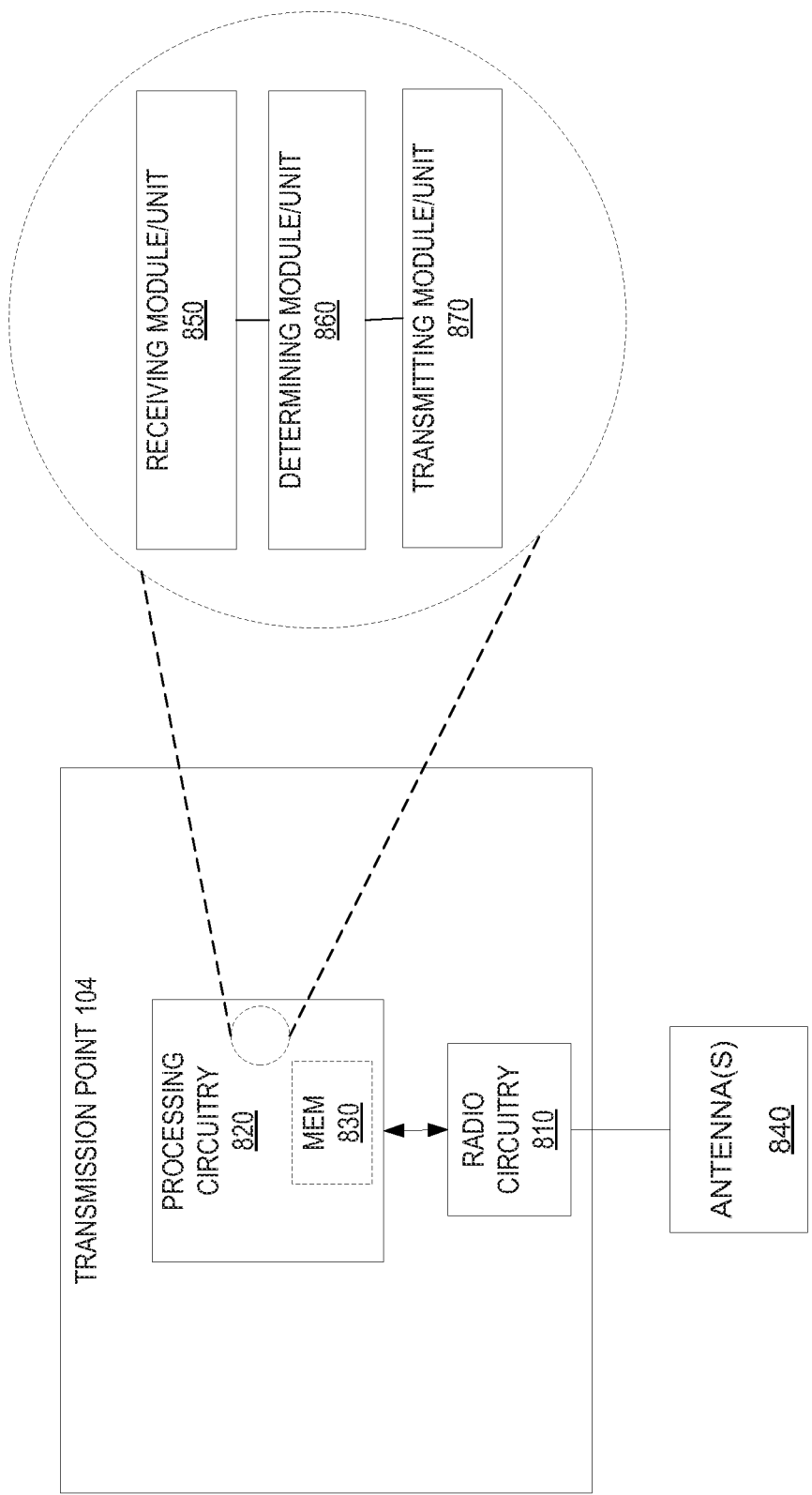
FIG. 8 is a block diagram of a transmission point according to one or more embodiments.

In view of this, a TP 104 in some embodiments comprises radio circuitry 810 and processing circuitry 820 as shown in FIG. 8. The radio circuitry 810 may be comprised as any number of transceiving, receiving, and/or transmitting units or circuitry. The radio circuitry 810 may for instance comprise transmitter circuits and receiver circuits that operate according to LTE or other known standards. In some examples, TP 104 further comprises a network interface (not shown) for communication with one or more TPs, the CoMP controller, and/or a core network.

Via this radio circuitry 810, the processing circuitry 820 is configured, e.g., by executable instructions in memory 830, to receive instructions for scheduling a user data transmission to the wireless communication device. The processing circuitry 820 is similarly configured to determine a transmission to perform on CSI radio resources, and perform the determined transmission on the CSI radio resources as described above. This transmission may occur via one or more associated antennas 840.

FIG. 8 also correspondingly illustrates certain functional means or units that the TP 104 implements in this regard. The TP 104 includes a receiving module or unit 850 configured for said receiving, a determining module or unit 860 configured for said determining, and a transmitting module or unit 870 configured for said transmitting as described above.

In another embodiment, the transmitting module is configured to perform the determined transmission on the CSI radio resources comprises advancing the transmission on CSI radio resources, relative to the scheduled user data transmission, by a period of time greater than or equal to an expected delay in receiving and processing CSI feedback from the wireless communication device indicating CSI measurements performed on those CSI radio resources.

In another embodiment, the transmitting module is configured to perform the determined transmission on the CSI radio resources comprises advancing the transmission on CSI radio resources, relative to the scheduled user data transmission, by a predetermined time interval.

In another embodiment, a receiving module is configured to receive CSI feedback indicating CSI measurements performed by the wireless communication device on the CSI radio resources, and performing the scheduled user data transmission on the user data radio resources after receiving and processing the CSI feedback.

In another embodiment, the determining module is configured, wherein the CSI radio resources comprise one or more CSI reference signal (CSI-RS) resources and one or more CSI interference measurement (CSI-IM) resources, and wherein the user data radio resources comprise radio resources of a physical downlink shared channel (PDSCH), in a Long Term Evolution (LTE) system.

Processing circuit(s) as used herein may comprise one or more processors, hardware circuits, firmware, or a combination thereof. Memory may comprise one or more volatile and/or non-volatile memory devices. Program code for controlling operation of a CoMP controller or TP may be stored in a non-volatile memory, such as a read-only memory or flash memory. Temporary data generated during operation may be stored in random access memory. The program code stored in memory, when executed by the processing circuit(s), causes the processing circuit(s) to perform the methods shown above.

Embodiments herein also include a computer program comprising instructions which, when executed by at least one processor of a node (i.e., CoMP controller 108 or TP 104), causes the node to carry out any of the methods herein. In one or more embodiments, a carrier containing the computer program is one of an electronic signal, optical signal, radio signal, or computer readable storage medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A coordinated multipoint (CoMP) controller for coordinating transmission from a CoMP cluster to a wireless communication device, the CoMP controller comprising:
    communication interface circuitry configured to communicate with transmission points controlled by the CoMP controller; and
    processing circuitry configured to:
        determine, from among multiple different coordination hypotheses for how to coordinate transmissions from the CoMP cluster to the wireless communication device, a coordination hypothesis to apply;
        apply the determined coordination hypothesis to the transmissions from the CoMP cluster on channel state information (CSI) radio resources on which the wireless communication device is to perform CSI measurements; and
        defer applying the determined coordination hypothesis to the transmissions from the CoMP cluster on user data radio resources, until after the determined coordination hypothesis is applied to the transmissions on the CSI radio resources.

2. The CoMP controller of claim 1, wherein said processing circuitry is configured to defer applying the determined coordination hypothesis to the transmissions from the CoMP cluster on the user data radio resources, until CSI feedback indicating said CSI measurements has been or is expected to have been received and processed by a radio resource manager for one or more transmission points in the CoMP cluster.

3. The CoMP controller of claim 1, wherein said processing circuitry is configured to defer applying the determined coordination hypothesis to the transmissions from the CoMP cluster on the user data radio resources, until after a predetermined time interval has passed since applying the determined coordination hypothesis to the transmissions on the CSI radio resources.

4. The CoMP controller of claim 1, wherein said processing circuitry is configured to maintain application of the determined coordination hypothesis to the transmissions on the user data radio resources over a CoMP coordination period, and wherein the CoMP coordination period is based on estimated CSI feedback delay and/or has a length that is an integer multiple of a periodic interval at which the wireless communication device reports CSI feedback indicating the CSI measurements.

5. The CoMP controller of claim 1, wherein said processing circuitry is configured to maintain application of the determined coordination hypothesis to the transmissions on the user data radio resources over a CoMP coordination period, and wherein the CoMP coordination period is based on an estimated length of a filter with which the CSI measurements are filtered.

6. The CoMP controller of claim 1, wherein said processing circuitry is configured to maintain application of the determined coordination hypothesis to the transmissions on the user data radio resources over a CoMP coordination period, and wherein the CoMP coordination period is specific to the wireless communication device and is different than a CoMP coordination period maintained for a different wireless communication device.

7. The CoMP controller of claim 6, wherein the CoMP coordination period specific to the wireless communication device comprises a first portion occurring during a first CoMP coordination period maintained for the different wireless communication device and comprises a second portion occurring during a second CoMP coordination period maintained for the different wireless communication device, and wherein said processing circuitry is configured to:
apply the determined coordination hypothesis to the transmissions from the CoMP cluster on the CSI radio resources on which the wireless communication device is to perform CSI measurements that reflect CSI during said first portion;
determine, from among the multiple different coordination hypotheses, a different coordination hypothesis; and
apply the different coordination hypothesis to the transmissions from the CoMP cluster on the CSI radio resources on which the wireless communication device is to perform CSI measurements that reflect CSI during said second portion.

8. The CoMP controller of claim 1, wherein said processing circuitry is configured to maintain application of the determined coordination hypothesis to the transmissions on the user data radio resources over a CoMP coordination period, and wherein the CoMP coordination period has a length corresponding to the longest of different CSI reporting periods configured for wireless communication devices in a defined set.

9. The CoMP controller of claim 1, wherein said processing circuitry is configured to defer applying the determined coordination hypothesis to the transmissions from the CoMP cluster on the user data radio resources, until after a time interval has passed since applying the determined coordination hypothesis to the transmissions on the CSI radio resources, and wherein said time interval is based on a longest CSI feedback delay experienced by wireless communication devices in a defined set.

10. The CoMP controller of claim 1, wherein the CSI radio resources comprise one or more CSI reference signal (CSI-RS) resources and one or more CSI interference measurement (CSI-IM) resources, and wherein the user data radio resources comprise radio resources of a physical downlink shared channel (PDSCH) in a Long Term Evolution (LTE) system.

11. A transmission point in a coordinated multipoint cluster for CoMP transmissions to a wireless communication device, the transmission point comprising:
radio circuitry; and
processing circuitry configured to:
receive, from a CoMP controller and via the radio circuitry, instructions for scheduling a user data transmission to the wireless communication device on user data radio resources in accordance with a determination by the CoMP controller for how to coordinate transmissions from the CoMP cluster to the wireless communication device;
determine, based on the instructions, a transmission to perform on channel state information (CSI) radio resources when performing the scheduled user data transmission; and
perform, via the radio circuitry, the determined transmission on the CSI radio resources before performing the scheduled user data transmission on the user data radio resources.

12. The transmission point of claim 11, wherein the processing circuitry is configured to perform the determined transmission on the CSI radio resources by advancing the transmission on the CSI radio resources, relative to the scheduled user data transmission, by a predetermined time interval or by a period of time greater than or equal to an expected delay in receiving and processing CSI feedback from the wireless communication device indicating CSI measurements performed on those CSI radio resources.

13. The transmission point of claim 11, wherein the processing circuitry is configured to receive CSI feedback indicating CSI measurements performed by the wireless communication device on the CSI radio resources, and perform the scheduled user data transmission on the user data radio resources after receiving and processing the CSI feedback.

14. The transmission point of claim 11, wherein the CSI radio resources comprise one or more CSI reference signal (CSI-RS) resources and one or more CSI interference measurement (CSI-IM) resources, and wherein the user data radio resources comprise radio resources of a physical downlink shared channel (PDSCH) in a Long Term Evolution (LTE) system.

15. A method implemented by a coordinated multipoint (CoMP) controller for coordinating transmission from a CoMP cluster to a wireless communication device, the method comprising:
determining, from among multiple different coordination hypotheses for how to coordinate transmissions from the CoMP cluster to the wireless communication device, a coordination hypothesis to apply;

applying the determined coordination hypothesis to the transmissions from the CoMP cluster on channel state information (CSI) radio resources on which the wireless communication device is to perform CSI measurements; and deferring applying the determined coordination hypothesis to the transmissions from the CoMP cluster on user data radio resources, until after the determined coordination hypothesis is applied to the transmissions on the CSI radio resources.

16. The method of claim 15, wherein said deferring comprises deferring applying the determined coordination hypothesis to the transmissions from the CoMP cluster on the user data radio resources, until CSI feedback indicating said CSI measurements has been or is expected to have been received and processed by a radio resource manager for one or more transmission points in the CoMP cluster.

17. The method of claim 15, wherein said deferring comprises deferring applying the determined coordination hypothesis to the transmissions from the CoMP cluster on the user data radio resources, until after a predetermined time interval has passed since applying the determined coordination hypothesis to the transmissions on the CSI radio resources.

18. The method of claim 15, wherein a CoMP coordination period specific to the wireless communication device comprises a first portion occurring during a first CoMP coordination period maintained for a different wireless communication device and comprises a second portion occurring during a second CoMP coordination period maintained for the different wireless communication device, and wherein the method further comprises:

applying the determined coordination hypothesis to the transmissions from the CoMP cluster on the CSI radio resources on which the wireless communication device is to perform CSI measurements that reflect CSI during said first portion;

determining, from among the multiple different coordination hypotheses, a different coordination hypothesis; and applying the different coordination hypothesis to the transmissions from the CoMP cluster on the CSI radio resources on which the wireless communication device is to perform CSI measurements that reflect CSI during said second portion.

19. A method implemented by a transmission point in a coordinated multipoint (CoMP) cluster for CoMP transmission to a wireless communication device, the method comprising:

receiving, from a CoMP controller, instructions for scheduling a user data transmission to the wireless communication device on user data radio resources in accordance with a determination by the CoMP controller for how to coordinate transmissions from the CoMP cluster to the wireless communication device;

determining, based on the instructions, a transmission to perform on channel state information (CSI) radio resources when performing the scheduled user data transmission; and performing the determined transmission on the CSI radio resources before performing the scheduled user data transmission on the user data radio resources.

20. The method of claim 19, wherein said performing the determined transmission on the CSI radio resources comprises advancing the transmission on the CSI radio resources, relative to the scheduled user data transmission, by a predetermined time interval or by a period of time greater than or equal to an expected delay in receiving and processing CSI feedback from the wireless communication device indicating CSI measurements performed on those CSI radio resources.

* * * * *